United States Patent [19]

Reymond et al.

[11] 4,115,006
[45] Sep. 19, 1978

[54] ARRANGEMENT FOR DETECTING LIGHT SOURCES

[75] Inventors: Jean-Claude Reymond; Alain Bellissant, both of Paris, France

[73] Assignee: Thomson-CSF, Paris, France

[21] Appl. No.: 767,187

[22] Filed: Feb. 9, 1977

[30] Foreign Application Priority Data

Feb. 13, 1976 [FR] France ................................ 76 04078

[51] Int. Cl.² ...................... G01B 11/26; H01J 39/20; H01J 3/14
[52] U.S. Cl. ............................... 356/152; 250/214 B; 250/216; 250/226; 356/83; 356/141
[58] Field of Search ..................... 356/4, 5, 141, 152, 356/83; 250/203 R, 216, 226, 214 B

[56] References Cited
U.S. PATENT DOCUMENTS

| | | | |
|---|---|---|---|
| 3,011,386 | 12/1961 | Rosenthal | 356/83 |
| 3,210,548 | 10/1965 | Morrison | 250/203 R X |
| 3,244,889 | 4/1966 | Preston et al. | 250/203 R X |
| 3,353,022 | 11/1967 | Schwartz | 250/203 R X |
| 3,653,765 | 4/1972 | Hearn | 356/93 X |
| 3,802,775 | 4/1974 | Hughes | 356/4 |
| 3,864,043 | 2/1975 | Russell | 356/152 |

Primary Examiner—S. C. Buczinski
Attorney, Agent, or Firm—Edwin E. Greigg

[57] ABSTRACT

An arrangement which enables the presence in an observed field of a light source whose radiation spectrum is known to be detected with a high signal to noise ratio. It includes an acousto-optical tunable filter controlled to scan through the expected spectrum of the source periodically and preferably linearly. The photodetected signals are processed by a high-pass filter which removes the D.C. component due to ambient interference radiation and provides a periodic signal which correspond to the observed light source. The arrangement applies, in particular, to the angular location of luminous targets.

8 Claims, 7 Drawing Figures

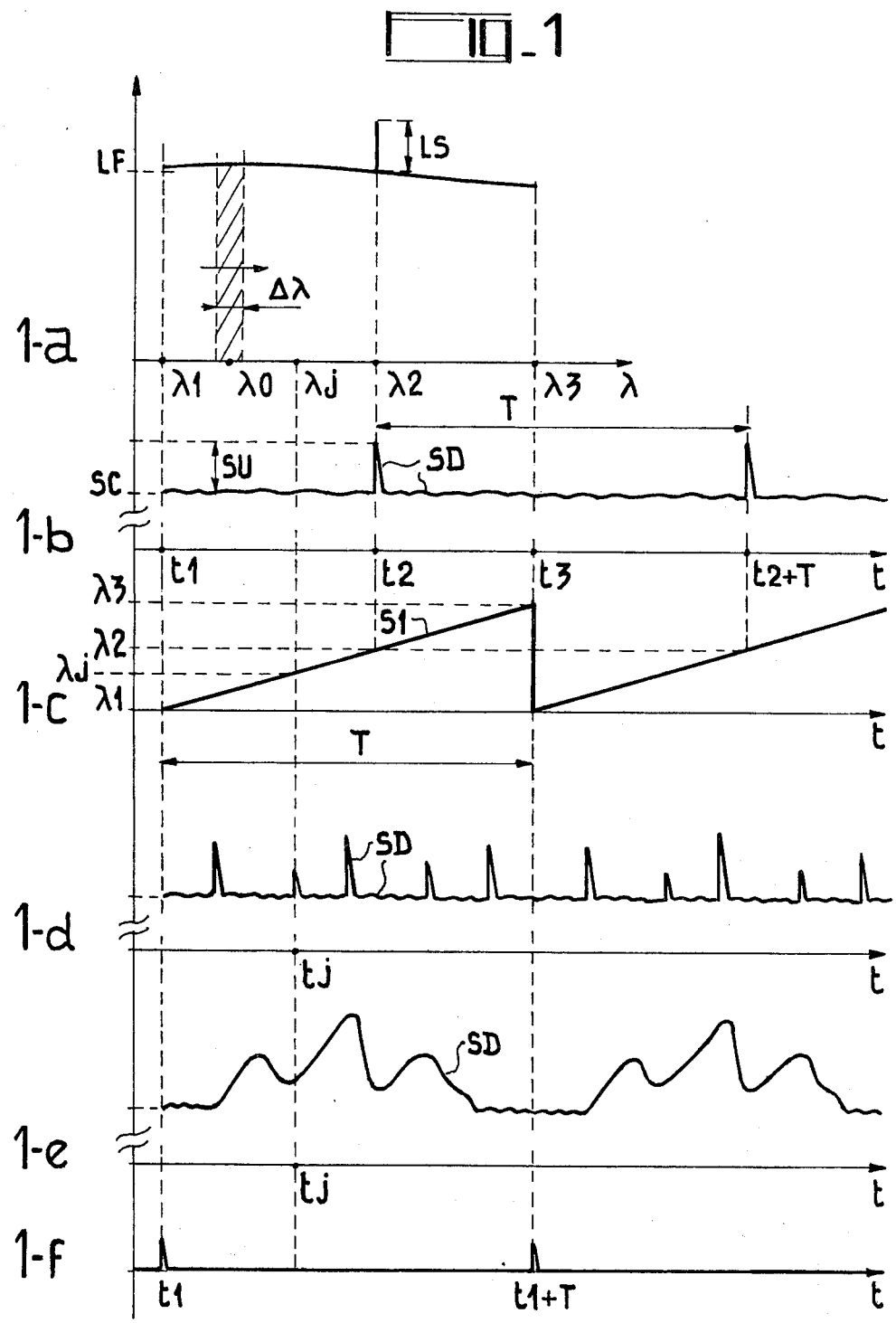

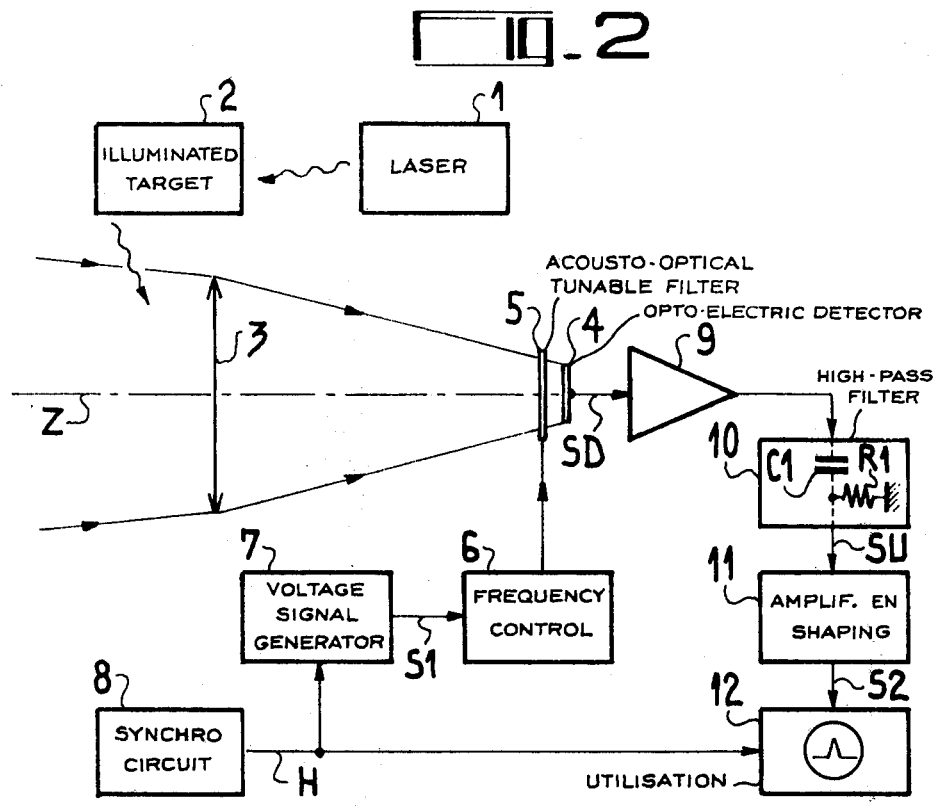
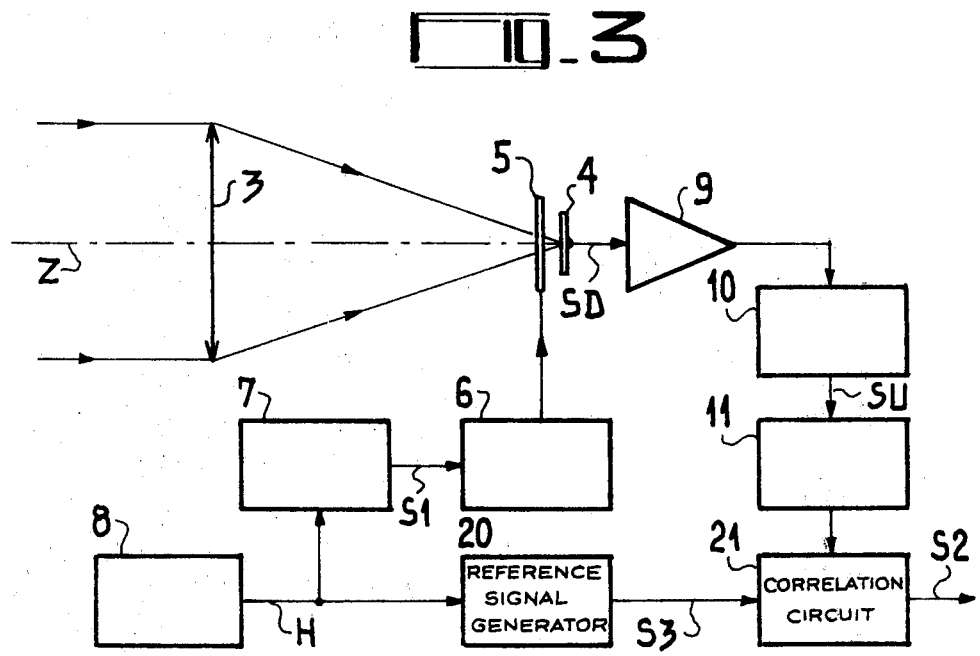

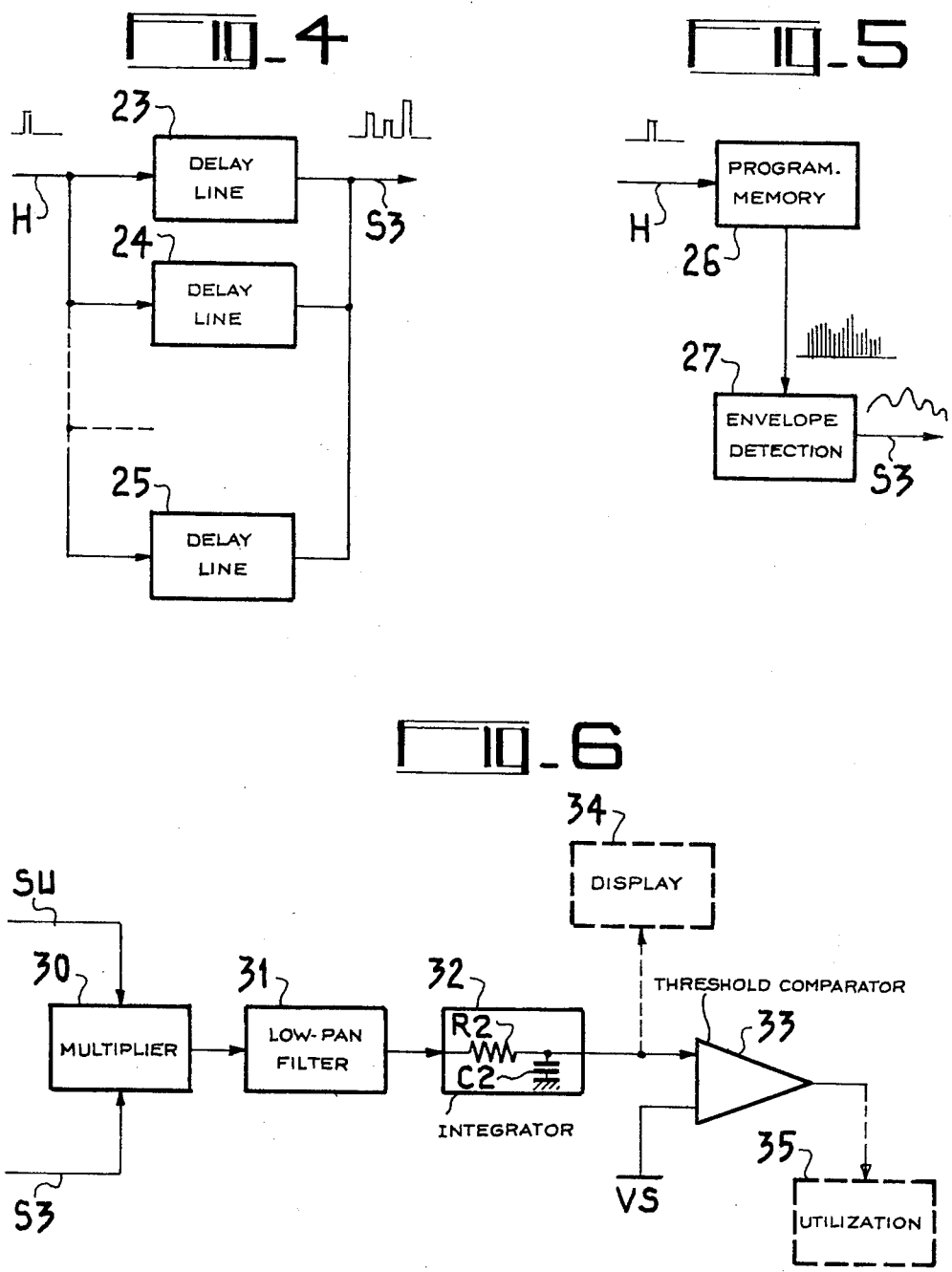

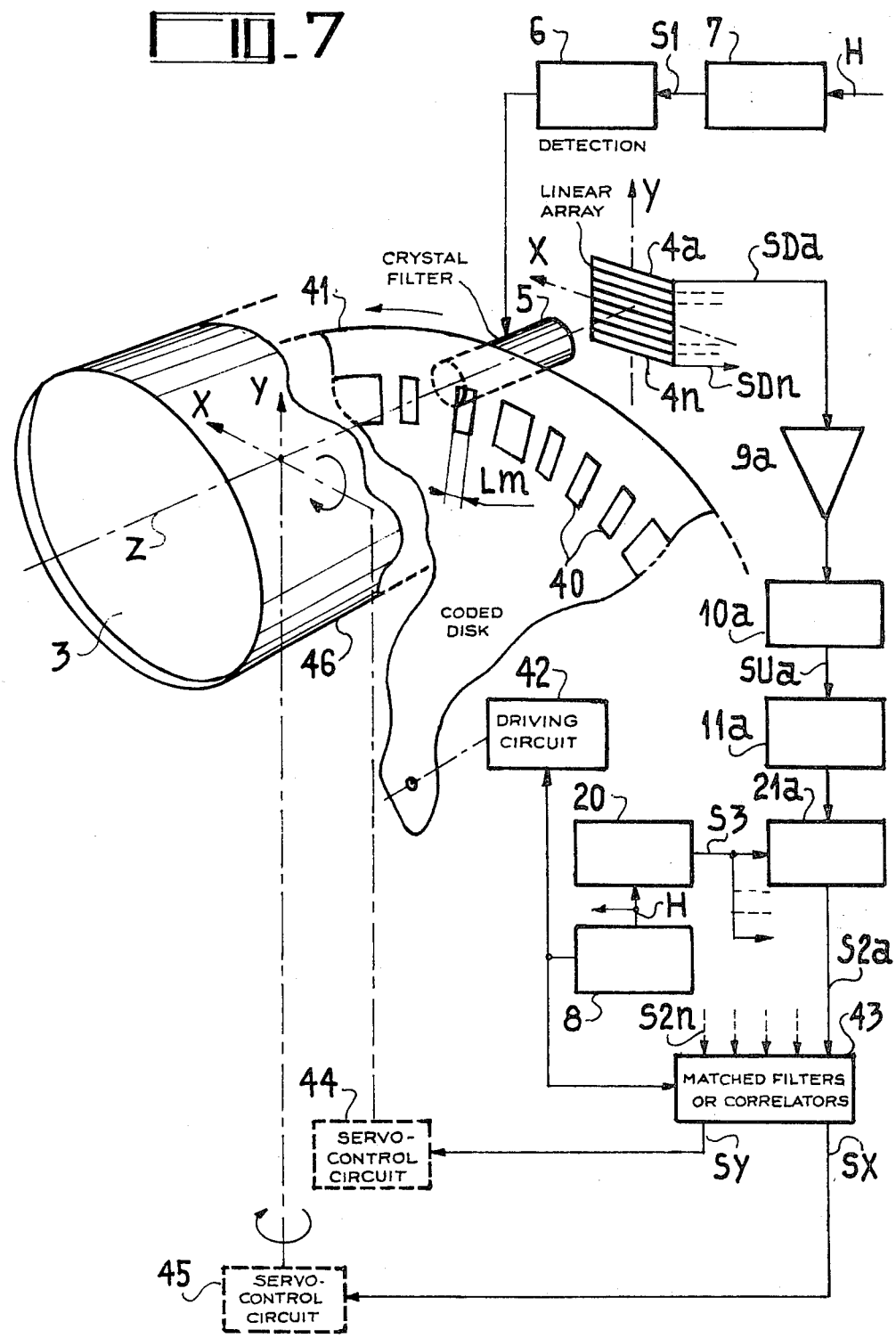

ARRANGEMENT FOR DETECTING LIGHT SOURCES

BACKGROUND OF THE INVENTION

The present invention relates to an arrangement for detecting light sources. The invention applies more particularly to the detection of a source which emits or reflects light radiation whose spectral characteristics are previously known.

The detection arrangement consists of an optical receiver associated with a photo-electric detector, to detect the light radiation originating from an observed field of predetermined angular extent centered on the optical sighting axis. The received radiation consists of useful radiation originating from the source, when the latter is present in the observed field, and of interference radiation which is produced by external interference sources either directly or by reflection. The apparent area of the source to be detected in the observed field is generally small, given its own dimensions and the fact of its being at a distance from the detecting arrangements. In addition, the brightness of the light generated by the source in the direction of the detection arrangement is generally low in comparison with that of the interference radiation originating from the background, i.e., from the area of observed space outside the source. The interference radiation is generally uniform and is that produced by radiation from the sun, which may be very strong.

Thus, in a given direction of sighting, interference light energy is received in the whole of the solid angle covered by the receiving optic and after detection it produces a substantially constant interference signal or noise level of high amplitude, while the useful signal is derived from the low level of light energy which is received in the solid angle defined by the apparent area of the source to be detected.

If a useful signal stronger than the interference signal can be obtained, this allows detection, but it is only possible if the light sources area of very high intensity and are the more so the farther they are away.

In order to overcome such disadvantages, it is known to increase the signal-to-noise ratio at detection by using various techniques which will be briefly reviewed below.

One solution consists in optically filtering the received radiation in a band which is as narrow as possible and matches the spectrum emitted by the source to be detected. In such arrangements the useful radiation preferably corresponds to one spectrum line in monochromatic operation or to a limited number of adjacent spectrum lines. In this way a large proportion of the interference radiation is removed by optical filtering and does not reach the detector.

Another solution which may be used conjointly with the previous one, consists in performing a physical sweep by means of transparent slots in an opaque background which are moved transversely to the optical axis to produce a temporal modulation of the detected signal.

OBJECT AND SUMMARY OF THE INVENTION

One object of the invention is to provide a high performance arrangement for detecting light sources in which an improvement in the signal-to-noise ratio is obtained by means of a special kind of optical filtering.

In accordance with a feature of the invention, there is provided an arrangement for detecting a light source having a known radiation spectrum, which comprises, successively, an optical receiver having an optical objective for focusing radiations originating from the observed field and an optical filter of predetermined passband for selecting the said spectrum, an opto-electrical detecting device, and a circuit for processing the detected signals to extract the useful signal corresponding to the said source, in which arrangement the said filter is of the highly selective tunable type and is controlled by an associated control device so as to scan the said spectrum periodically and successively to select the various transmitted wave lengths, at each scan, and in which the said processing circuit consists of a high-pass filter of predetermined cut-off frequency to eliminate the D.C. component due to the ambient interference radiation which is received, and to select the useful periodic component due to the radiation from the source.

BRIEF DESCRIPTION OF THE DRAWING

The invention will now be further described with reference to the accompanying drawing, which shows:

FIG. 1, waveforms relating to the method of operation of an arrangement according to the present invention;

FIG. 2, a diagram relating to a simplified ambodiment of the detection arrangement;

FIG. 3, a general diagram of a detecting arrangement according to the invention;

FIGS. 4 to 6, diagrams of embodiments of some of the circuits making up an arrangement as shown in FIG. 3; and FIG. 7, a simplified overall diagram of an embodiment of arrangement as shown in FIG. 3.

FIG. 1a represents the brightness and spectrum of the light which is received by the detection arrangement in a planned spectral operating band which is restricted to wavelengths between $\lambda 1$ and $\lambda 3$.

DETAILED DESCRIPTION OF THE INVENTION

Interference light from a steady background, which is generally radiation from the sun, shows little variation with wavelength $\lambda$, the spectrum being of the black body type. The variation in the spectrum is slow and the mean brightness value LF is substantially constant in the operating band. The brightness LS of the source forms an addition to the above brightness at the emission wavelengths. In the case shown the emission is assumed to be monochromatic of wavelength $\lambda 2$.

The principle of operation which is utilized consists in scanning the spectral band $\lambda 1$ to $\lambda 3$, which band is predetermined to be sufficiently wide to contain the various wavelengths in the anticipated emission spectrum, the scan being performed by shifting the wavelength $\lambda 0$ to which a highly selective filter is locked, that is to say a filter whose pass band $\Delta\lambda$ is very narrow. Thus, the different lines lying between the minimum anticipated value $\lambda 1$ and the maximum value $\lambda 3$ of the band to be scanned are successively selected by filtering. In the case of a monochromatic emission, the detected signal SD (FIG. 1b) contains a D.C. component SC due to the interference brightness LF produced during the duration of the scan between $t1$ and $t3$, and a useful component US due to the source, which occurs at the time t2 when the filtering corresponding to the emission wavelength λ2 is taking place.

Preferably, the spectral scan through the operating band λ1 to λ3 is performed according to a linear time law which is demonstrated by the sawtooth curve S1 in FIG. 1c.

In addition, the spectral scan is repeated cyclically and preferably takes place successively with a period T corresponding to the length of one scan (FIG. 1c). Consequently, the useful signal SU is repeated periodically with the same repetition period (FIG. 1b), which then enables virtually the whole of the D.C. component SC due to interference radiation to be eliminated by electrical filtering and enables the periodic useful signal to be selected.

FIG. 1d relates to an emission which contains a plurality of distinct spectrum lines which may be produced by one or more lasers for example. When the optical filtering corresponds to one of these lines, such as that of wavelength λj, a useful signal is produced whose amplitude is proportional to the power emitted at this wavelength.

FIG. 1e relates to the case of an emission spectrum of the steady type which covers a spectral range of specific extent. An emitter of the incoherent type such as an electroluminescent diode, for example, may exhibit such characteristics.

It is understood that the scanned band or range λ1 to λ3 is made sufficiently restricted but covers the emission spectrum.

FIG. 2 is a simplified diagram of an embodiment of the detection arrangement where the emission is monochromatic. The emission means are symbolized by block 1 and may consist of a laser or a laser diode. The source symbolised by block 2 is assumed to be remote and to be contained within the reception field. It is understood that the term "source" which is used means a target to be detected, generally a moving airborne target, which target may be active, that is to say may possess emission means of its own, or passive i.e., may be illuminated by a remotely situated emitter 1 such as a ground emitter and may reflect a proportion of the emitted light energy to the detection arrangement. In either case, it is assumed that what is called the source preferably produces substantially omnidirectional radiation so that it radiates inter alia in the direction of the detection arrangement.

The optical receiver is symbolized by an optical entry objective 3 whose optical axis is Z and which is associated with an opto-electrical detector 4 whose detection surface is positioned substantially in the image plane of the observed field, i.e., in the focal plane, and is generally centered on the optical axis Z. The optical detector preferably consists of a plurality of detecting elements to allow location in space, such as a mosaic to allow location in elevation and bearing. For reasons of simplicity, it will be assumed at this time to be formed from a single element 4 which thus has a single detection and receiving channel corresponding to it. To allow distant sources to be detected, the detector is located substantially at the focus of the optical objective 3. An optical filter 5 is inserted in the optical reception path, preferably close to the detector 4 so that a filter of small dimensions may be used.

The optical filtering is performed by an optical filter device of the acousto-optical tunable kind which present a high selectivity. The tuned frequency of the filter, and thus its very narrow pass band, are shifted through the planned spectral band λ1 to λ3 by the application of a suitable controlling command which is generally in the form of an electrical signal. A progressive scan of the spectrum emitted by the light source is thus made by filtering.

Such a filter may be formed by a crystal of lithium niobate, into which acoustic waves are transmitted by means of a piezoelectric transducer which receives an electrical signal from an associated control circuit. A description of such a filter has been published, inter alia, in the "Journal of the Optical Society of America", volume 59, number 6, June 1969, pages 744 to 747 in an article entitled "Acousto-Optic Tunable Filter" by S. E. Harris and R. W. Wallace.

The filtering arrangement includes a crystal 5 and an associated control circuit 6 to produce the desired frequency conversion in response to an appropriate external signal S1, the tuned frequency of the crystal being in general a function of the amplitude of the control signal S1. To obtain a frequency swing which is linear in time and periodic, the control circuit 6 receives a signal S1, of the form shown in FIG. 1c, which is produced by a sawtooth voltage generator 7 which in turn is triggered by a clock signal H of period T (FIG. 1f) which is supplied by an ancillary synchronizing circuit 8.

The detected signal SD (FIG. 1b) is amplified in a preamplifier circuit 9 associated with the opto-electrical detector 4 and is then processed in a filter circuit 10 to remove the D.C. component SC due to the interference radiations detected and the internal receiver noise. Circuit 10 is of the high-pass filter type and may, for example, take the form of an RC circuit which is indicated schematically by a capacitor C1 and a resistor R1. The receiver circuits 11 downstream of the filter consist of amplification circuits and possibly of peak-clipping and shaping circuits, to convert the output SU from filter circuit 10 into a useful signal S2 suitable for the intended use. An ancillary user device is symbolized by block 12 and the form it takes is a function of the application envisaged. In the example considered in FIG. 2 it may be formed, as shown, by a cathode-ray display in which the horizontal scan is controlled by the synchronizing signal H and which receives the signal SU as a vertical deflection signal. Such a system enables the presence or absence of the expected light source to be detected in the observed field.

In the more general case where the emission contains a plurality of spectrum lines (FIG. 1d) of known wavelength or again is a continuous spectrum (FIG. 1c) of known form, the detection arrangement differs from that in FIG. 2 in having additional receiver circuits inserted in the reception chain downstream of the filtering circuits 10 and amplifying circuits 11. These additional circuits are formed, as shown, by correlating circuits 20, 21 or equivalent matched filter circuits. Correlating circuit 21 receives the signal SU after amplification and also a reference signal S3, which is a replica of the expected signal SU to allow identification by autocorrelation. The reference signal S3 is produced by the generator circuit 20 when ordered to do so by a clock pulse H and it is thus produced periodically with the same period T as is used to control the operation of the filter 5. Circuit 20 may be formed by a programmable read-only memory which emits the signal S3 representing the expected spectrum at an external command.

When the emission is made up of a plurality of spectrum lines, circuit 20 may be produced from delay lines, such as the delay lines 23, 24, 25 shown in FIG. 4, so as to obtain an equal number of pulses having different delays to match the signal to be reproduced (FIG. 1d). Different amplitudes may be achieved by using respective amplifier circuits of predetermined gain. An equivalent structure may be obtained with a delay line circuit of the multiple tapping type which is able to produce a plurality of values of delay.

In the case of an emission having a spectrum of the continuous type (FIG. 1e), circuit 20 may consist of a programmed memory circuit 26 as shown in FIG. 5 which is followed by an envelope detecting circuit 27 such as a low pass detector or filter. Each clock pulse H actuates the memory 23, which emits a train of pulses representing a smooth outline for the expected spectrum.

FIG. 6 relates to an embodiment of the correlation circuit 21 in FIG. 3. It includes a multiplying circuit 30 which receives the signals to be correlated and which is connected by its output to integrating circuits. The latter comprise a filter circuit 31 whose pass band is matched to the video spectrum of the received signals, and an integrating circuit 32. The matched filter 31 consists of a low-pass filter whose cut-off frequency is between $1/2T$ and $1/T$ so as to eliminate the unwanted components of the video spectrum of form (sin u/u). The output signal of filter 31 is practically steady and it is integrated in circuit 32. The latter consists of an RC circuit whose time constant value $R_2C_2$ is determined as a function of the period T of the signal and of the response time required from the receiver. The time constant is so calculated that the signal at the terminals of the integrating capacitor C2 is substantially equivalent to the mean value of the incident signal. The output of circuit 31 may thus be used directly by a display device 34. For other uses, as symbolized by block 35, the output signal is processed by comparison with a threshold level VS in a comparator circuit 33. The level of threshold VS is generally adjusted to allow operations to take place with a predetermined false alarm rate.

Arrangements for detecting light sources are generally so equipped as to provide signals for locating the target angularly in bearing and elevation, and possibly so as to be able to use these signals to perform an automatic tracking operation which holds the optical axis Z pointing at the target. For this purpose, the detection arrangement contains a plurality of detecting elements. In one embodiment use is made of a detector consisting of four quadrants and for reception channels, in which the signals are processed to produce data giving measurements of divergence in bearing (or azimuth) SX and elevation SY with respect to horizontal X and vertical Y reference axes respectively. Another technique consists in modulating the incident optical signal by means of transparent slots in an opaque background which move transversely to the optical path and intercept the received beam.

An embodiment of this kind is shown in FIG. 7. The detecting device is formed by a linear array of detector elements $4a$ to $4n$ which are arranged parallel to direction X and are juxtaposed in direction Y. The modulation is produced by an optical track carried by a flat disc 41 which is made to rotate uniformly about an axis parallel to direction Z. The optical track is assumed to be formed by transparent slots 40 in an opaque background to produce a predetermined numerical coding such as a pseudo-random sequence. A drive device 42 which is controlled by the synchronizing circuit 8 controls the uniform rotation of the disc 41. It is necessary for the spectral scan of period T to take place during the minimum interval between the end of one interruption of the optical beam and the beginning of the next interruption. In other words, if $Lm$ is the minimum slot width and $Tm$ is the time taken by this slot to move past the optical axis Z, period T should satisfy the condition of T being equal to or less than $Tm$.

The receiver downstream of the detector has n similar channels, although for reasons of simplicity only one of these, namely the channel a leading from the first detector element $4a$, is shown, consisting of a preamplifier $9a$, a filter $10a$, an amplifier $11a$, and a correlator $21a$. A single generator circuit 20 for generating reference signals S3 feeds all the multipliers in the n correlation channels $21a$ to $21n$ simultaneously. Each correlator circuit includes a final threshold comparison circuit (33, FIG. 6) and in this way the output of that detector on which the image of the target has been formed supplies a useful signal to processing circuits 43 situated downstream. In addition to the spatial selection which is thus performed in direction Y, circuit 43 performs an additional spatial selection in direction X by measuring the time delay between the useful signal and a predetermined temporal reference. To this end, the circuits 43 may consist in conventional fashion of filter circuits matched to the modulation produced by the slots 40 or of correlators so that divergence measuring signals SX, SY, which give divergence in bearing and elevation, may finally be supplied to an ancillary user circuit. By way of example, as shown in the diagram of FIG. 7, the axis Z may be trained automatically on the target by servo-control circuits 44 and 45. The support 46 for the detection arrangement as a whole is orientated in elevation by rotating about an axis lying in direction Y. The outputs of the servo-control circuits 44 and 45 control these rotations as a function of the divergence values SX, SY relating to the target.

Thus, by utilizing selective optical filtering, the tuning of which can be varied cyclically, the detection arrangement according to the invention allows the difficulties created by ambient radiation to be avoided and provides improved performance. In particular, it may advantageously be applied in the production of an optoelectric system for the angular location of targets by their light or to an optical divergence measuring system.

What is claimed is:

1. An arrangement for detecting a light source having a known expected radiation spectrum in an observed field, comprising: optical receiving means for focusing incident light radiation originating from said field and consisting of ambient interference radiation and said expected radiation; optical filtering means comprising an acousto-optical tunable filter controlled by a control device to scan periodically and according to a predetermined law of change in frequency with time the frequency of the filter through an operating band which corresponds substantially to that of the said expected spectrum so as successively to filter the various received wavelengths therein; opto-electrical detection means for detecting said filtered and focused incident radiation; and a processing circuit for processing the detected signals and comprising a high-pass filter of predetermined cut-off frequency to eliminate the D.C. component due to the ambient interference radiation and to provide a periodic useful signal due to radiation from said source.

2. A detection arrangement according to claim 1 for detecting a light source whose spectrum contains a plurality of wavelengths, wherein the processing circuit includes, downstream of the high-pass filter, a correlation circuit which receives the said useful signal to be correlated with a local reference signal representing the expected spectrum, a generator circuit for generating the said reference signal, and a synchronizing means to produce a clock signal at the said scanning period for synchronizing the said control device and the said reference generator.

3. A detection arrangement according to claim 2, wherein the said reference generator circuit comprises a plurality of delay lines connected in parallel which receive the said clock signal simultaneously.

4. A detection arrangement according to claim 2, wherein the said reference generator circuit comprises a programmed memory controlled by the said clock signal and connected in series with an envelope detector circuit.

5. A detection arrangement according to claim 2, wherein the correlation circuit comprises, connected in series, a multiplier circuit which receives the said useful and reference signals, a low-pass filter circuit whose cut-off frequency is between 1/2T and 1/T, T being the scan period, an integrating circuit to provide the mean value of the filtered signal, and a comparison circuit for comparing the said mean value with a threshold level.

6. A detection arrangement according to claim 1, for detecting light source having a monochromatic spectrum, wherein the processing circuit comprises said high-pass filter connected in series with amplifying and shaping circuits.

7. A detection arrangement according to claim 2, in which the control device comprises, a circuit for controlling the frequency of the tunable filter on reception of a control signal whose change in amplitude causes the said law of change, and a generator circuit synchronized by the said clock signal for generating periodically the said control signal, and wherein the said tunable filter comprises a lithium niobate crystal and piezoelectric transducer and the said control circuit receives a cyclic sawtooth signal from the said controlling generator circuit to provide a linear scan through the said operating band.

8. A detection arrangement according to claim 7 and intended for the angular location of a said light source, wherein the detector means comprises a linear array of $n$ detector elements each connected to said processing circuit to form $n$ reception channels, and wherein there is provided a device for modulating by traversing transparent slots in an opaque background transversely past the optical axis of the optical receiving means, and receiver circuits for processing the signals from the said $n$ channels by matched filtering or correlation to produce signals representing measurements of divergence in bearing and elevation of said source, the minimum width of the said slots being so calculated that the corresponding time taken to traverse is at least equal to the said clock period.

* * * * *